(12) United States Patent
Moline da Luz

(10) Patent No.: US 8,622,414 B2
(45) Date of Patent: Jan. 7, 2014

(54) VEHICLE COUPLING DEVICE

(76) Inventor: Wenceslao Moline da Luz, Montevideo (UY)

(\*) Notice: Subject to any disclaimer, the term of this patent is extended or adjusted under 35 U.S.C. 154(b) by 10 days.

(21) Appl. No.: 13/253,541

(22) Filed: Oct. 5, 2011

(65) Prior Publication Data

US 2012/0119468 A1    May 17, 2012

(30) Foreign Application Priority Data

Oct. 6, 2010    (UY) .......................................... 32932

(51) Int. Cl.
*B60D 1/02*    (2006.01)
(52) U.S. Cl.
USPC ........... 280/515; 280/477; 280/508; 280/504; 280/509
(58) Field of Classification Search
USPC .................. 280/477, 508, 504, 515
See application file for complete search history.

(56) References Cited

U.S. PATENT DOCUMENTS

| | | | | |
|---|---|---|---|---|
| 2,478,736 A * | 8/1949 | Balzen | ......................... | 280/477 |
| 2,976,061 A * | 3/1961 | Embree | ......................... | 280/509 |
| 4,417,748 A * | 11/1983 | Dortch | ......................... | 280/477 |
| 4,462,327 A * | 7/1984 | Pertramer et al. | ............. | 114/90 |
| 4,560,184 A * | 12/1985 | Williams, Jr. | ................. | 280/477 |
| 4,579,365 A * | 4/1986 | Breu | ............................. | 280/507 |
| 5,024,467 A * | 6/1991 | Truchet | ........................ | 285/365 |
| 6,739,614 B2 * | 5/2004 | Holmgren et al. | ........... | 280/515 |
| 7,192,047 B2 * | 3/2007 | Sauermann | .................. | 280/509 |
| 7,322,594 B2 * | 1/2008 | Liljeblad et al. | .......... | 280/415.1 |
| 7,547,035 B2 * | 6/2009 | Scharmuller | ................ | 280/477 |
| 2001/0032486 A1 * | 10/2001 | Doucette | ........................ | 70/266 |
| 2004/0200258 A1 * | 10/2004 | Hess | .............................. | 72/705 |
| 2006/0249927 A1 * | 11/2006 | Metternich et al. | .......... | 280/515 |

\* cited by examiner

*Primary Examiner* — Kevin Hurley
*Assistant Examiner* — Michael Stabley
(74) *Attorney, Agent, or Firm* — Defillo & Associates, Inc; Evelyn A. Defillo

(57) ABSTRACT

A device for coupling a vehicle to a vehicle to be towed includes using an air blast typically from the brake system to automatically hitch the 2 vehicles. A three position pneumatic valve is utilized to allow for the hitching and unhitching of the 2 vehicles.

6 Claims, 4 Drawing Sheets

VEHICLE COUPLING DEVICE

FIELD OF THE INVENTION

The present invention relates to a pneumatic and automatic hitching device for truck and trailer, and more specifically, a device applicable to all kind of trucks to hitch and unhitch the trailer that it must move. The invention aims at solving the problem existing in trucks during the hitching and unhitching of the corresponding trailer, replacing any manual hitching and unhitching mechanism with levers and springs by a pneumatic and automatic system.

STATE OF THE ART

In the mechanisms of the hitching devices between trucks and trailers, such as Lupo hitches or Lupo-type hitches of manual activation, the main problem is the difficulty in making the verticality of the bolt coincide with the hole on the shaft, since, from the truck's cabin, the driver cannot see the hitching. Normally, solving this problem is attempted counting with the help of another person who gives instructions to the driver while he/she maneuvers the truck so as to hitch the bolt and the shaft, which is very dangerous for the assistant. Also, these hitches require a lot of play between the bolt and the shaft's hole for the hitching to be achieved and, therefore, during the movement of the vehicle the mechanism is permanently impacted.

Automatic hitches also exist, such as the Rokinger, Silpa, Rondon, etc. which have a dome that solves the problem of going backwards guiding the shaft when entering into the hitch. A trigger activates the spring that introduces the bolt into the shaft. This spring never exceeds a force of 50 direct kilograms. It also needs a large hole on the shaft to hitch up to 2 mm in new equipment, necessary for hitching in certain positions of the truck and trailer.

The unhitching of all hitches is done manually by means of levers, all of them with ball-shaped bolts to absorb the movements that are produced between the truck and the trailer.

Such movements consequently produce little contact surface area and a rapid wearing of the hitch.

SUMMARY OF THE INVENTION

With the purpose of solving the problems of conventional hitches such as those mentioned before, the pneumatic and automatic hitch for truck and trailer object of the present invention has been developed. This pneumatic hitch constitutes true technological progress based on using the air blast of the braking system of the truck and the trailer to introduce and remove the bolt from the shaft, with a force of around 800 direct kilograms, 16 times more force that the springs used in conventional automatic hitches. The 800-Kg permanent pressure manages to have the bolt look for the shaft hole to introduce it as well as to remove it. This enables the driver to hitch and unhitch the truck and the trailer with no need of help of an assistant, as was already explained, being able to adjust the play light between the shaft hole and the bolt up to 0.15 mm, in this way solving all the problems that the impacts on the mechanism on the road and the consequent accelerated wear usually cause.

Therefore, the object of the present invention is to provide a pneumatic and automatic hitching device for truck and trailer, applicable to all models of trucks to hitch and unhitch the trailer that it must move, the device being of the type that has a frontal dome that guides the centering of the end of the trailer shaft so the hitch bolt of the truck's chassis goes through it. The posterior side of the dome of the device incorporates a pneumatic cylinder in which interior is a bolt joint to a piston, said bolt being capable of going through the eye of the trailer's shaft. The bolt is cylindrical and can rotate as regards the conic silentblock discs for mounting the hitch to the chassis bridge of the truck or directly to the chassis through an elastic harness. The pneumatic cylinder is connected to a pneumatic activation valve of said cylinder, which has an input connected to the air blast circuit of the truck.

The pneumatic valve is a rotating valve of double effect and of three positions that define:

a) a first position with air circulation in one direction and discharge in the other direction; b) a second triggering position; and c) a third position which is opposite to the direction of the first position. The valve includes a distribution lever linked to a mechanical safety lock (13) to set the position thereof.

BRIEF DESCRIPTION OF THE FIGURES

For greater clarity and comprehension of the object of this invention, it has been illustrated in several figures which represent it according to the preferred embodiments, all by way of example, where.

DETAILED DESCRIPTION OF THE INVENTION

Figure 1:
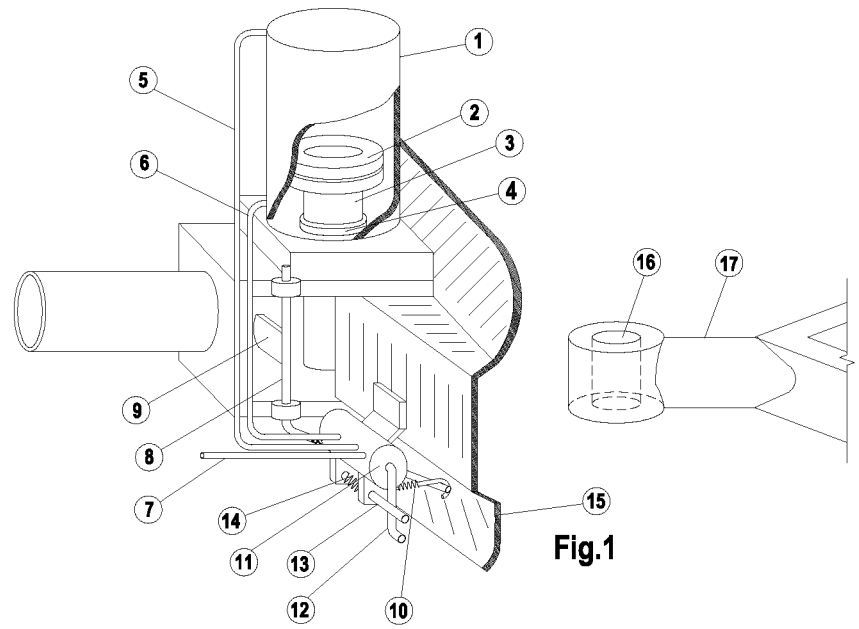
FIG. 1 is a partial cut view in perspective that shows the hitching device object of the present invention and the end of the trailer's shaft.

In FIG. 1, the pieces that form part of the hitching device are shown, which attaches to the truck and the end of the trailer's shaft according to the following reference numbers:

(1) Double-effect pneumatic cylinder.
(2) Pneumatic cylinder piston with seals.
(3) Pneumatic cylinder bolt joint to the piston.
(4) Bolt retainer, seals lower chamber.
(5) Air pipe to feed the upper part of the cylinder
(6) Pipe coming from valve (11)
(7) Air pipe to feed the system, comes from the truck.
(8) Rod to produce the automatic hitch.
(9) Plates so that the shaft touches and activates the hitching system.
(10) Automatic system spring.
(11) Double-effect pneumatic valve with safety system.
(12) Handle for the manual activation of the pneumatic valve
(13) Lock button of valve positioning and safety
(14) Safety device spring
(15) Dome of the hitch
(17) Trailer shaft
(18) Body of the valve

(19) Air-distributing piece of three positions with rotating axle

Figure 6:
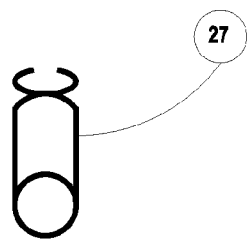
FIG. 6 is a frontal view of a pin used to ensure extreme hitch safety.

As can be noted, in the mechanism of the hitch device, the bolt (3) is in an upper end joint to a piston (2) of a double-effect pneumatic cylinder (1), which when connected to a double-effect pneumatic valve (11) allows hitching and unhitching the truck to and from the trailer. The compressed air to activate the pneumatic system shall be obtained from the air circuit of the truck itself (7). The bolt (3) of the piston (2) slides inside the cylinder (1) and is commanded by the pneumatic valve (11). The valve (11) is connected to a safety system (13) and a mechanical system for its automatic hitching functioning defined by the rod (8), the plate (9) and the spring (10), resulting in this way a pneumatic and automatic hitch. After hitching the shaft (17), one must place a pin (27) (see FIG. 6) manually to give the hitch an extreme safety.

It is worth mentioning that the main innovative characteristics of this hitching device consist in the incorporation of the double-effect pneumatic cylinder (1) and the pneumatic valve (11) with safety and automation thereof. Since it is a pneumatic mechanism, the device allows adjusting the bolt (3) in the eye (16) of the shaft (17) up to 0.15 mm in the diameter, in this way avoiding the impacts at the top of the bridges, among other advantages.

The pneumatic system requires the bolt (3) of the hitch to be cylindrical in all its length due to the sealing by means of retainers of the cylinder (1) in its lower and upper chambers. The bolt (3) being fully cylindrical is advantageous since it is guided in the entire eye (16) of the shaft (17) and it may rotate on its own axis which increases the hitching surface area and, hence, its duration, but it requires the hitch to pivot vertically. The existing hitches of this kind, Lupo or Lupo-type, present the accelerated wear of a transversal horizontal bolt that it must have and their mounting into the chassis, which has several types of problems, as inconveniences. However, the hitch claimed is more compact, safer, lighter, it does not need lubrication, it lasts longer and it does not cause problems of breaks in the chassis.

Figure 2:
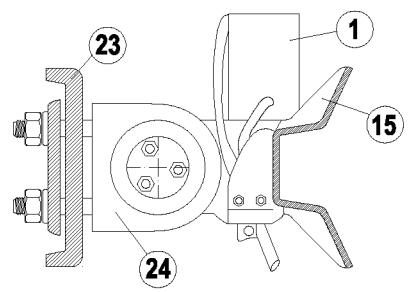
FIGS. 2 and 3 are elevated lateral views of the hitching device with external discs that hitch directly to the truck's chassis bridge or to the elastic harness, respectively.
Figure 3:
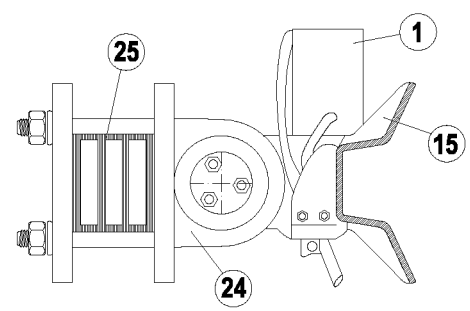
Figure 4:
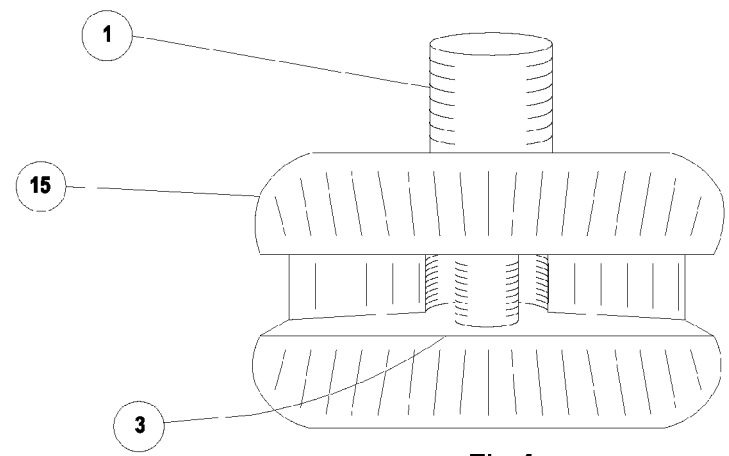
FIG. 4 is an elevated frontal view of the device.
Figure 5:
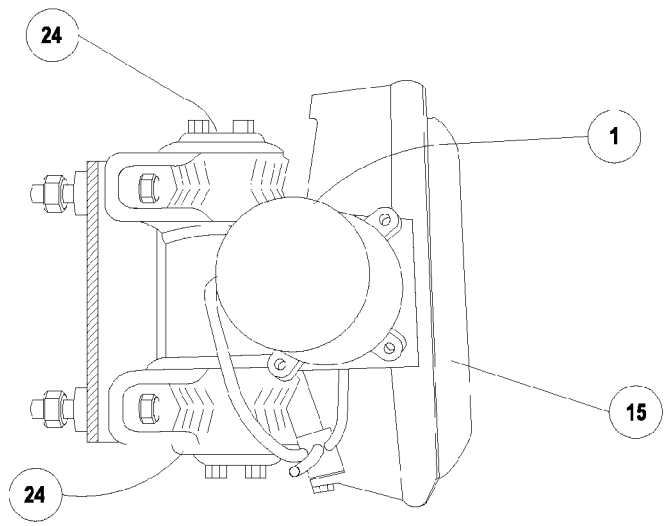
FIG. 5 is an upper view of the device.

This hitching device is mounted with four through-bolts through the respective 21-mm holes in the truck's chassis, everything remaining joint and avoiding breaks in the chassis bridge. The full vertical turn of the hitch allows the absorption of movements and achieving a perfect hitch without vibrations or pulls between the truck and the trailer. The hitch does not absorb rotation; therefore, the end of the shaft must be able to rotate. The fact that the pivot does not need lubrication is worth mentioning. FIGS. 2 and 3 show that the attachment of this device to the truck's chassis may be carried out with double silentblock conic discs to pivot vertically, which maintains the hitch always in horizontal position with external discs (24) of the silentblock that are directly attached to the truck's chassis bridge (23), or to the elastic harness (25), for example of FIAT type, with four fixation screws. The silentblock may slide and maintain the previous unhitched position.

Figure 7:
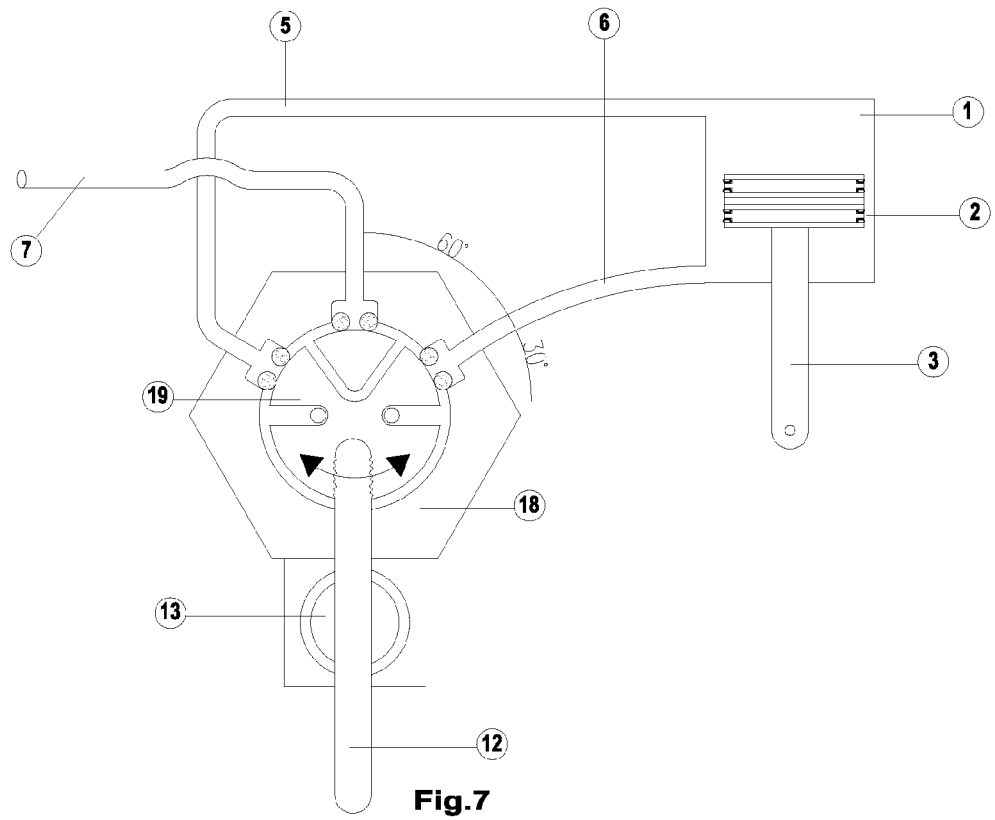
FIG. 7 is a transversal cut view of a pneumatic valve developed as part of the hitching device.
Figure 8:
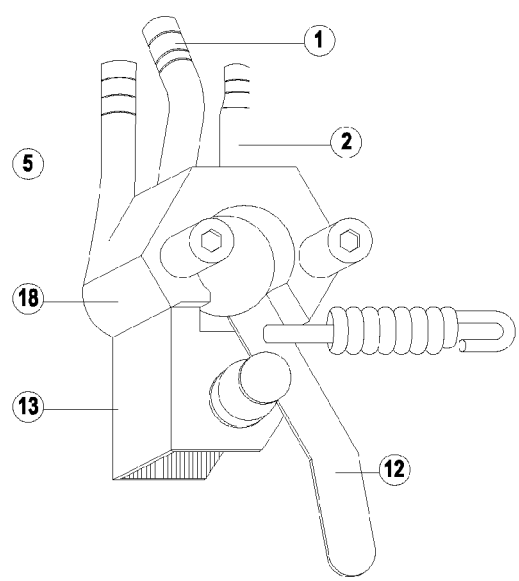
FIG. 8 is a view in perspective of the valve represented in FIG. 7.
Figure 9:
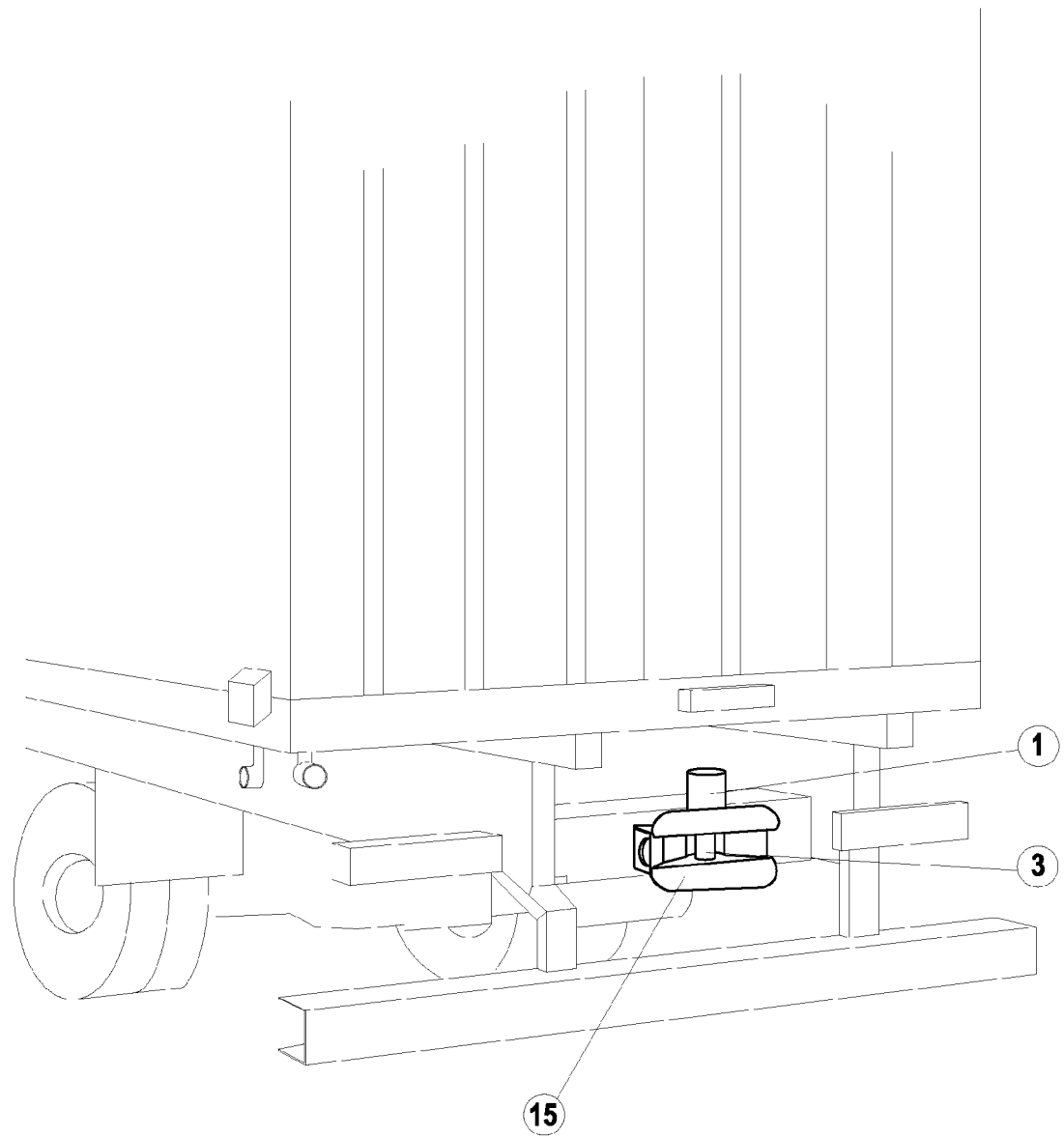
FIG. 9 is a partial perspective view taken from the posterior side of the load box of a truck where the hitching device is shown installed.

Given the non-existence of a pneumatic valve that carried out the necessary functions for the pneumatic and automatic hitching device herein proposed, the valve illustrated in FIGS. 7 and 8 has been developed. This double-effect valve (11) is a rotating valve and has three positions that define: a) a first position with air circulation in one direction and discharge in the other direction; b) a second triggering position; and c) a third position which is exactly opposite to the direction of the first position. Also, the valve (11) is linked to a mechanical lock of high safety before impacts, stones, etc., that includes a lock activation button. Such as FIGS. 7 and 8 show, the pneumatic valve (11) includes the following parts: (5, 6, 7, 12, 13, 18, 19).

The efficiency and advantages of this pneumatic hitching device was verified carrying out repeated trials in bulk, sand and cattle equipment, in equipment with dumps, in chipping trailers and others, which enabled making a projection of the useful life of the device for different types of uses, different powers of equipment and different types of mountings of the trucks.

The invention claimed is:

1. A double-effect pneumatic automatic hitching and unhitching device for truck and trailer comprising:
    a frontal dome that guides a centering of an end of a shaft of the trailer so a hitch bolt passes to a truck's chassis;
    a posterior side of the frontal dome of the device incorporates a pneumatic cylinder, the pneumatic cylinder includes a bolt joint to a piston, said bolt passing through an eye of the shaft, the pneumatic cylinder being connected to a pneumatic valve that activates said cylinder for the hitching and the unhitching, which has an input connected to an air blast circuit of the truck; and
    the pneumatic valve is a double-effect rotating valve that has a first position with air circulation in one direction and discharge in the other direction; a second triggering position; and a third position which is opposite to the direction of the first position.

2. The double-effect pneumatic automatic hitching and unhitching device of claim 1, wherein the pneumatic valve has a one piece body with a rotating axle of air distribution in which a permanent air input and a distribution lever is connected, linked to a mechanical lock of its position and safety.

3. The double-effect pneumatic automatic hitching and unhitching device of claim 1, wherein the hitch bolt is cylindrical and rotates regarding the silent block discs for mounting the hitch screwed to the truck's chassis or an elastic harness.

4. The double-effect pneumatic automatic hitching and unhitching device of claim 1, further including double silent block conic discs for mounting the hitch.

5. A double-effect pneumatic automatic hitching and unhitching device comprising:
    a double-effect pneumatic cylinder without rod, with an undetachable covering in an upper side to form an upper air chamber, and a detachable covering in an inferior side to form an inferior air chamber, said inferior covering having a retainer system with seals;
    the cylinder includes inside a piston with seals moving in both directions, said piston being joint to a bolt that goes up and down when compressed air enters into the cylinder;
    a bolt being sealed to the inferior covering of the cylinder by means of the retainer system;
    the inferior air chamber being sealed with the bolt by means of the retainer system;
    a double-effect pneumatic automatic valve with an automatically activated safety system connected to the upper and inferior air chambers of the cylinder;
    a hitching and an unhitching bolt; and
    the double-effect pneumatic automatic valve controls the cylinder and the hitching and unhitching bolt;
    wherein the pneumatic automatic valve includes:
    an external body including: a central hole, a second hole, and a third hole;
    a compressed air connection externally located in relation to each one of the holes;

the central hole being connected to one of the central compressed air connections and this one to the truck;

the other of the compressed air connection is connected to the second hole and to the upper air chamber of the cylinder for air charging and discharging;

the other compressed air connection is connected to the third hole and to the inferior air chamber of the cylinder for air charging and discharging one;

the inferior side of the valve includes a bolt of axial movement in relation to an axle that includes a pushing spring that simultaneously activates the hitching and the automatic safety system, located in the middle of a distribution lever run;

inside the external valve body there is a rotating axle with the distribution lever having rotation at one of its ends; and an air distribution rotating axle with four holes which are located in the vertical surface coinciding their location with the holes of the external valve, the two central ones being interconnected and the other two being directed to the center of the rotating axle connected to axial holes of air discharge.

6. A double-effect pneumatic automatic hitching and unhitching device comprising:

a double-effect pneumatic cylinder without rod, with an undetachable covering in an upper side to form an upper air chamber, and a detachable covering in an inferior side to form an inferior air chamber, said inferior covering having a retainer system with seals;

the cylinder includes inside a piston with seals moving in both directions, said piston being joint to a bolt that goes up and down when compressed air enters into the cylinder;

a bolt being sealed to the inferior covering of the cylinder by means of the retainer system;

the inferior air chamber being sealed with the bolt by means of the retainer system;

a double-effect pneumatic automatic valve with safety system connected to the upper and inferior air chambers of the cylinder; and wherein the double-effect pneumatic valve is a double-effect rotating valve having:

a first position that simultaneously activates a first and a second air circulation duct, the first air circulation duct charges the cylinder in one of the chambers of the cylinder and the second air circulation duct simultaneously discharges in the other chamber of the cylinder;

a second triggering position; and a third position which is opposite to the direction of the first position.

\* \* \* \* \*